United States Patent
Ghosh et al.

(10) Patent No.: US 8,721,999 B2
(45) Date of Patent: May 13, 2014

(54) PROCESS FOR SIMULTANEOUS PRODUCTION OF POTASSIUM SULPHATE, AMMONIUM SULFATE, MAGNESIUM HYDROXIDE AND/OR MAGNESIUM OXIDE FROM KAINITE MIXED SALT AND AMMONIA

(75) Inventors: Pushpito Kumar Ghosh, Bhavnagar (IN); Haresh Mahipatlal Mody, Bhavnagar (IN); Jatin Rameshchandra Chunawala, Bhavnagar (IN); Maheshkumar Ramniklal Gandhi, Bhavnagar (IN); Hari Chand Bajaj, Bhavnagar (IN); Pratyush Maiti, Bhavnagar (IN); Himanshu Labhshanker Joshi, Bhavnagar (IN); Hasina Hajibhai Deraiya, Bhavnagar (IN); Upendra Padmakant Saraiya, Bhavnagar (IN)

(73) Assignee: Council of Scientific and Industrial Research, New Delhi (IN)

(*) Notice: Subject to any disclaimer, the term of this patent is extended or adjusted under 35 U.S.C. 154(b) by 0 days.

(21) Appl. No.: 13/981,957

(22) PCT Filed: Mar. 29, 2010

(86) PCT No.: PCT/IN2010/000194
§ 371 (c)(1),
(2), (4) Date: Jul. 26, 2013

(87) PCT Pub. No.: WO2010/109492
PCT Pub. Date: Sep. 30, 2010

(65) Prior Publication Data
US 2013/0315805 A1    Nov. 28, 2013

(30) Foreign Application Priority Data
Mar. 27, 2009    (IN) ............................ 618/DEL/2009

(51) Int. Cl.
*C01C 1/24* (2006.01)
*C01D 5/00* (2006.01)
*C01F 5/08* (2006.01)
*C01F 5/14* (2006.01)

(52) U.S. Cl.
CPC ... *C01C 1/24* (2013.01); *C01D 5/00* (2013.01); *C01F 5/08* (2013.01); *C01F 5/14* (2013.01)
USPC .......... 423/162; 423/173; 423/158; 423/199; 423/545; 423/551; 423/636

(58) Field of Classification Search
CPC ............... C01C 1/24; C01F 5/08; C01F 5/14; C01D 5/00
USPC .......... 423/162, 173, 158, 199, 545, 551, 636
See application file for complete search history.

(56) References Cited

U.S. PATENT DOCUMENTS

| 3,207,576 A | * | 9/1965 | Marullo et al. ............... 423/199 |
| 3,348,913 A | * | 10/1967 | Veronica ........................ 423/199 |
| 3,436,175 A | * | 4/1969 | Atwood et al. ............... 423/162 |
| 7,041,268 B2 | | 5/2006 | Ghosh et al. |
| 8,182,784 B2 | * | 5/2012 | Paul et al. ..................... 423/551 |

FOREIGN PATENT DOCUMENTS

WO    2008/120746 A1    10/2008

OTHER PUBLICATIONS

Karl-Heinz Zapp et al.: "Ammonium Compounds; 2. Ammonium Sulfate"; Ullmann's Encyclopedia Of Industrial Chemistry; Jun. 15, 2000, pp. 1,11-14, XP002592516; online 001: 10.1002/14356007. a02_243; Retrieved from the Internet: URL:http://mrw.interscience.wiley.com/emrw    /9783527306732/ueic/article/a02_243/current/pdf; [retrieved on Jul. 15, 2010]; p. 13, paragraph 2.2.5.
Gopinath, N.D.: "Production of Ammonium Sulfate"; "II"; In: "Phosphoric Acid" 1968, Marcel Dekker, New York; XP002592517; vol. 1; pp. 541-566 cited in the application pp. 541, 545, p. 553

* cited by examiner

*Primary Examiner* — Timothy Vanoy
(74) *Attorney, Agent, or Firm* — Ladas & Parry LLP Scheme 1

(57) ABSTRACT

Kainite mixed salt is treated with water to obtain solid schoenite and a schoenite end liquor. The latter is desulphated using recycled $CaCl_2$ and thereafter evaporated to obtain camallite crystals, from which KCl is recovered, and a liquor rich in $MgCl_2$. Gypsum produced during desulphatation is reacted with aqueous ammonia and $CO_2$ to produce ammonium sulphate and calcium carbonate. The calcium carbonate is calcined to obtained CaO and $CO_2$. The CaO is slaked and reacted with the $MgCl_2$-rich liquor generated above to produce slurry of $Mg(OH)_2$ in aqueous $CaCl_2$. To this surface modifying agent is added while hot and, after cooling, the slurry yields surface modified $Mg(OH)_2$. The filtrate rich in $CaCl_2$ is recycled for desulphatation process above. The solid surface modified $Mg(OH)_2$ may he calcined to produced MgO. The schoenite and KCl are reacted to produce solid sulphate of potash.

16 Claims, 1 Drawing Sheet

Scheme 1
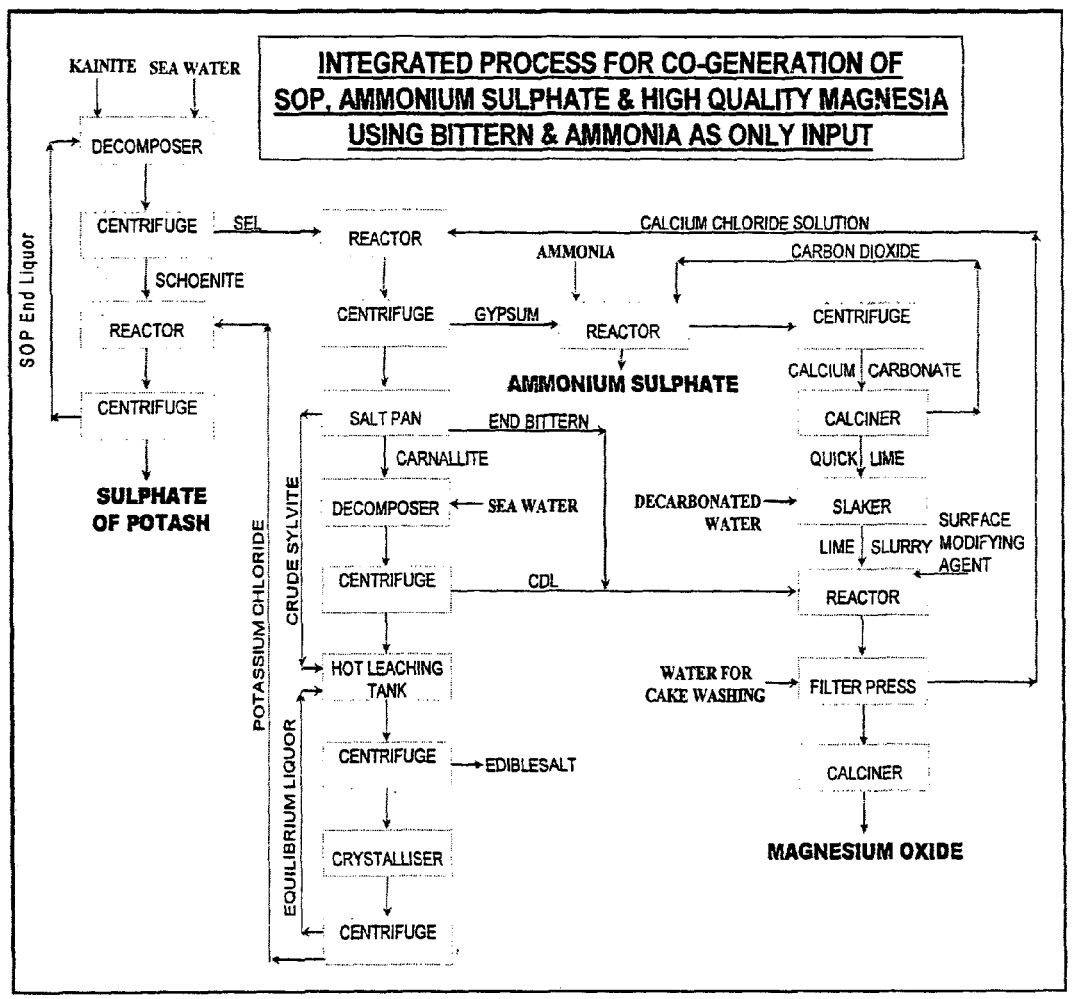

PROCESS FOR SIMULTANEOUS PRODUCTION OF POTASSIUM SULPHATE, AMMONIUM SULFATE, MAGNESIUM HYDROXIDE AND/OR MAGNESIUM OXIDE FROM KAINITE MIXED SALT AND AMMONIA

RELATED APPLICATION INFORMATION

This application is a 371 International Application PCT/IN2010/000194 filed 29 Mar. 2010 entitled "Process For Simultaneous Production Of Potassium Sulphate, Ammonium Sulfate, Magnesium Hydroxide And/Or Magnesium Oxide From Kainite Mixed Salt And Ammonia", which was published in the English language on 30 Sept. 2010 with International Publication Number WO 2010/109492 A1 and which claims priority from Indian Patent Application 618/DEL/2009, filed 27 Mar. 2009, the content of which are incorporated herein by reference.

FIELD OF THE INVENTION

The present invention provides a process for the simultaneous production of sulphate of potash (SOP), ammonium sulphate, surface modified magnesium hydroxide and/or magnesium oxide being characterized in the co-generation of the said products using kainite mixed salt and ammonia as the only consumable raw materials.

BACKGROUND OF THE INVENTION

Kainite mixed salt is obtained from salt bitterns. In pure form it is a double salt of $KCl.MgSO_4.3H_2O$ although as obtained from salt bitterns it typically contains impurities of NaCl and $MgCl_2.6H_2O$.

Potassium sulphate is a dual fertilizer containing 50% $K_2O$ and 18% Sulfur. It has other applications also as documented in the prior art.

Magnesium hydroxide is commercially used in pulp and paper industries and also as antacid, fire retardant, mild base and as intermediate in the production of fertilizer, magnesia and diverse magnesium chemicals.

Ammonium sulphate is used as dual fertilizer containing 21.5% N and 24.6% S. It is also used as raw material for production of various chemicals.

Reference may be made to U.S. Pat. No. 7,041,268, May 9, 2006 by Ghosh et al. which covers extensively the prior art related to production of potassium sulphate (also referred to as sulphate of potash or SOP) from bittern sources.

Reference may again be made to the same patent which discloses the preparation of potassium sulphate and magnesia in integrated manner from kainite mixed salt and lime. Gypsum is obtained as a by-product. Crude kainite salt obtained from salt bitterns through solar evaporation is treated with water and a waste stream of the process to convert it into schoenite ($K_2SO_4.MgSO_4.6H_2O$) while simultaneously leaching out unwanted impurities present in the crude kainite. The leachate, containing $K^+$, $Na^+$, $Mg^{2+}$, $Cl^-$ and $SO_4^{2-}$ is desulphated with $CaCl_2$ and allowed to further evaporate to recover carnallite double salt ($KCl.MgCl_2.6H_2O$) which is decomposed with water and hot leached to obtain KCl in pure form while the $Mg^{2+}$-rich mother liquor is treated with lime to produce $Mg(OH)_2$ with co-production of $CaCl_2$ required for desulphatation. Schoenite and KCl are treated with water to recover $K_2SO_4$ in solid form while the mother liquor is recycled in the kainite decomposition step. The main drawback of the process is that the quality of lime can vary and, with it, the quality of the magnesium hydroxide. Another drawback is the disposal of by-product gypsum for which it is difficult sometimes to find a market.

Reference may be made to U.S. Pat. No. 4,504,458, Mar. 12, 1985 by Knudsen which discloses a process for converting gypsum into potassium sulphate or sodium sulphate by subjecting aqueous slurry of gypsum with anion exchanger (in chloride form) under acidic conditions which resulted into calcium chloride solution and resin in sulfate form. The anion exchange resin is then contacted with potassium chloride or sodium chloride solution thereby regenerating the sulphate loaded resin to form chloride loaded resin and potassium sulfate or sodium sulfate solution.

Reference may be made to E. Sacher, ISMA Tech. Conf. 1968 which describes the Merseberg process for the manufacture of ammonium sulfate from natural gypsum.

Reference may also be made to the article "Disposal or use of gypsum in production of ammonium sulfate" by N. D. Gopinath in Phosphoric Acid, Vol. 1, Part II, (ed. A. V. Slack), Marcel Dekker, New York, 541-566 (1968) which discusses the conversion of gypsum into ammonium sulfate by its reaction with ammonium carbonate. No detailed process parameters are given or are any mention made of the utility of the by-product calcium carbonate.

During the wet process manufacture of phosphoric acid, the basic raw material from which most phosphatic fertilizers are made, concentrated phosphate rock is reacted with sulfuric acid which results in the production of substantial quantities of by-product gypsum known as "phosphogypsum". Various proposals have been made for converting phosphogypsum and gypsum into useful and economical products by chemical means. In every instance, although technically feasible, the cost of the chemicals required to carry out the conversion has been greater than the value of the resulting product. An example is the reaction of gypsum with ammonia and carbon dioxide to form ammonium sulfate and calcium carbonate. Because of its low purity as compared to natural gypsum, the use of phosphogypsum has not proven economical in this manner.

Reference may be made to the article by M. Chou et al. in www.anl.gov/PCS/acsfuel/preprint%20archive/Files/40_4_CHICAGO_08-95_0896.pdf This teaches the production of ammonium sulfate and calcium carbonate from gypsum. The reaction produces insoluble calcium carbonate and an ammonium sulfate solution. The authors state therein that the technique, although attractive in principal, is not commercially viable due to issues around cost and quality of natural gypsum and the lack of availability of an economical source of carbon dioxide.

Reference may be made to the Solvay Process which teaches the preparation of soda ash from NaCl, $NH_3$ and $CO_2$ with co-generation of $NH_4Cl$. $CO_2$ is obtained by calcination of limestone ($CaCO_3$) while the lime obtained is reacted with $NH_4Cl$ to recycle the ammonia with co-production of waste $CaCl_2$ which is let out as effluent.

Magnesium oxide is an important compound that finds application in various industries. Magnesium oxide has the highest melting point of the moderately priced oxides and is therefore an important raw material for refractory bricks and other materials. It is the only material apart from $ZrO_2$ that can withstand long term heating above 2000° C.

Reference may be made to US Patent application 20007019121 by Ghosh et al. which discloses a process for the preparation of MgO from the reaction of magnesium salt with caustic soda or lime. The crude $Mg(OH)_2$ is directly calcined and then treated with water to disintegrate the mass spontaneously to yield a slurry and dissolve away the soluble salts. This slurry is much easier to filter and wash than the original $Mg(OH)_2$ slurry. No mention is made of any process to speed up filtration of the $Mg(OH)_2$ slurry itself.

OBJECT OF THE INVENTION

The main object of the invention is to devise an integrated process for the simultaneous production of sulphate of potash, ammonium sulphate, magnesium hydroxide and/or magnesium oxide from kainite mixed salt, and ammonia.

Another object is to convert by-product gypsum generated in the SOP/MgO process of U.S. Pat. No. 7,041,268 into more valuable ammonium sulphate fertilizer by the known prior art of the Merseberg process while, utilizing the by-product calcium carbonate in the integrated process itself.

Another object is to subject the calcium carbonate to calcination and utilize the carbon dioxide in the production of ammonium sulphate.

Another object is to utilize the lime obtained on calcination of calcium carbonate for the preparation of $Mg(OH)_2$ along with $CaCl_2$ co-product which is required for desulphatation of schoenite end liquor.

Another object of the invention is to generate lime of consistently high quality in the process itself so that the $Mg(OH)_2$ obtained therefrom is also of consistently high quality.

Another object is to surface modify the $Mg(OH)_2$ to improve its filterability during processing.

Another object is to use such surface-modified $Mg(OH)_2$ in applications where such modification is desirable.

Another object is to subject the surface modified $Mg(OH)_2$ to calcination to produce MgO that is free of the surface modifier and having ≥97% purity.

Another object is to filter the schoenite end liquor of the process of the prior art of U.S. Pat. No. 7,041,268 to insure that the gypsum obtained on desulphatation of the liquor—and which is subsequently used in the Merseberg process—is free from insolubles.

Another object is to wash the gypsum with water to remove soluble salts to insure that the ammonium sulphate liquor and calcium carbonate are free from such impurities.

Another object is to ensure >95% conversion of gypsum in the Merseberg process.

Another object is to neutralize residual ammonia in the filtrate of the Merseberg process with sulphuric acid to eliminate the need for ammonia recovery while simultaneously raising the concentration of ammonium sulphate in the liquor.

Another object is to subject the aqueous ammonium sulphate to evaporative crystallization to recover solid ammonium sulphate and to recycle the ammonium sulphate mother liquor in subsequent batch of ammonium sulphate production.

Another object is to take advantage of the relatively higher solubility of gypsum in water to wash out residual gypsum in the calcium carbonate and upgrade it to a purity >98%.

Another object is to use $CaCO_3$ of high purity to initiate the integrated process.

Another object is to minimize fresh water requirement in the process.

SUMMARY OF THE INVENTION

Accordingly, the present invention provides a process for the simultaneous production of sulphate of potash (SOP), ammonium sulphate, surface modified magnesium hydroxide and/or magnesium oxide being characterized in the co-generation of the said products using kainite mixed salt and ammonia as the only consumable raw materials, the said process comprising the following steps:

a) converting in a first reaction zone, kainite mixed salt into schoenite by the process of aqueous leaching, wherein the aqueous leaching process comprises reacting kainite mixed salt with water and SOP end liquor of step (e) followed by separating the pure schoenite and schoenite end liquor (SEL);

b) treating the clear schoenite end liquor obtained in step (a) with aqueous $CaCl_2$ to separate out sulphate in the form of gypsum followed by filtering the mass to recover gypsum and desulphated schoenite end liquor;

c) subjecting the desulphated schoenite end liquor obtained in step (b) to evaporation to obtain solid carnallite and a liquor rich in $MgCl_2$;

d) decomposing the carnallite obtained in step (c) with water to recover KCl and carnallite decomposed liquor (CDL) containing $MgCl_2$ and residual KCl;

e) treating the pure schoenite of step (a) with KCl obtained in step (d) to produce sulphate of potash (SOP) while recycling the SOP end liquor in the process of step (a);

f) washing the gypsum recovered in step (b) to minimize adhering impurities;

g) contacting in a second reaction zone gypsum obtained in step (f) with liquor ammonia or recycled ammonium sulphate mother liquor obtained in step (i) and carbon dioxide obtained in step (k) to produce ammonium sulphate solution and by-product $CaCO_3$ by the Merseberg reaction;

h) filtering out the $CaCO_3$ from the products of step (g) followed by neutralizing the filtrate with sulphuric acid to convert residual ammonia into ammonium sulphate;

i) evaporating the neutralized filtrate obtained in step (h) to recover ammonium sulphate while recycling the ammonium sulphate mother liquor in step (g);

j) washing the $CaCO_3$ obtained in step (h) with water to minimize unreacted gypsum and adhering soluble impurities followed by calcination for 1-3 hrs at 800-1000° C. to obtain $CO_2$ and quicklime of high purity;

k) bottling the $CO_2$ and recycling in step (g);

L) slaking the lime generated in step (j) with decarbonated water and treating with CDL generated in step (d) and/or $MgCl_2$-rich liquor obtained in step (c) to produce dispersion of $Mg(OH)_2$ and aqueous $CaCl_2$;

m) adding a surface modifying agent to facilitate filtration of $Mg(OH)_2$ while simultaneously obtaining surface-modified $Mg(OH)_2$ required for special compounding applications;

n) separating the surface-modified $Mg(OH)_2$ from the slurry obtained in step (m) by any known process and recovering $CaCl_2$-containing filtrate followed by recycling it for the desulphatation process of step (b);

o) calcining the $Mg(OH)_2$ obtained in step (n) to recover MgO of high purity which simultaneously burns off the surface modifier.

In an embodiment of the invention, the kainite mixed salt is composed of 15-22% KCl; 15-22% NaCl; 28-40% $MgSO_4$ and 5-10% $MgCl_2$.

In another embodiment of the invention, the operation of aqueous leaching is carried out utilizing fresh water or brackish ground water or even seawater along with the recycled SOP end liquor.

In another embodiment of the invention, the ratio of $K^+$ in the form of pure schoenite and SEL of step (a) was 0.8-1.2 depending on amount of water added and the sulphate content of SEL was in the range of 5-12% (w/v).

In another embodiment of the invention, the gypsum obtained in step (b) above purity in the range of 96-99% (w/w).

In another embodiment of the invention, the residual ammonia in the filtrate obtained in step (h) was neutralized with sulphuric acid to convert it into ammonium sulphate.

In another embodiment of the invention, the $CaCO_3$ obtained in step (h) above had purity in the range of 95 to 97%.

In another embodiment of the invention, $CaCO_3$ obtained in step (h) was washed with water to minimize unreacted gypsum and adhering soluble impurities.

In another embodiment of the invention, the calcination of $CaCO_3$ in step (j) was carried out in the temperature range of 800-1000° C. for a period of 1 to 3 hrs.

In another embodiment of the invention, the decarbonated water used in the preparation of the lime slurry (slaked lime) of step (l) was obtained by treating the water with lime and removing suspended matter.

In another embodiment of the invention, the magnesium chloride in carnallite decomposed liquor was supplemented with $MgCl_2$-rich liquor of step (e), if required, for the preparation of $CaCl_2$ and $Mg(OH)_2$ as per the process of step (l).

In another embodiment of the invention, the molar ratio of lime to $MgCl_2$ was in the range of 0.8:1 to 0.95:1 in the reaction of step (l).

In another embodiment of the invention, the surface modifying agent was a free fatty acid, and more particularly, stearic acid and the ratio of surface modifying agent to $Mg(OH)_2$ in step (m) was in the range of 0.01:1 to 0.05:1 (w/w).

In another embodiment of the invention, the rate of filtration of $Mg(OH)_2$ was 2-3 times faster in a filter press and the $Mg(OH)_2$ wet cake had 8-15% lower moisture content than without use of surface modifying agent.

In another embodiment of the invention, the purity of MgO obtained in step (o) was in the range of 95-99.5% (dry weight basis).

The Figure shows a reaction scheme for performing an embodiment of the invention.

DETAILED DESCRIPTION OF THE INVENTION

Schoenite end liquor obtained in the SOP/MgO process of U.S. Pat. No. 7,041,268 is first filtered prior to desulphatation and the resultant gypsum, after water wash, is reacted with aqueous ammonia and $CO_2$ to produce ammonium sulphate and calcium carbonate. The calcium carbonate is then washed with water to minimize unreacted gypsum impurity and then calcined to obtained CaO and $CO_2$. The CaO is then converted into lime slurry by slaking in decarbonated water. The slaked lime is reacted with carnallite decomposed liquor (CDL) and/or appropriate $MgCl_2$-rich stream to produced slurry of $Mg(OH)_2$ in aqueous $CaCl_2$. To this surface modifying agent is added to improve filterability and also to produce surface modified $Mg(OH)_2$ required in specific applications while the rest of the $Mg(OH)_2$ is calcined to burn off the surface modifier and simultaneously produce MgO of high purity. The $CaCl_2$ solution obtained on filtration is used in the desulphatation process yielding desulphated schoenite end liquor from which KCl is obtained for further reaction with pure schoenite to yield SOP thus completing the entire cycle of integration.

The main inventive step is the integration of the known SOP/MgO process with the Merseberg process to realize multiple gains.

Another inventive step is achieving such integration through use of gypsum generated as by-product in the SOP/MgO process.

Another inventive step is the complete utilization of by-product calcium carbonate generated in the Merseberg process.

Another inventive step is utilization of calcium carbonate in the form of its constituent parts, namely lime and carbon dioxide, both of which are essential for the integrated process and are readily obtained by calcination of calcium carbonate.

Another inventive step is to achieve independence from lime quality in the integrated SOP/MgO process and to instead generate lime of consistently high quality in the process itself so that the $Mg(OH)_2$ obtained is also consistently of high quality.

Another inventive step is to achieve such high quality of lime by taking high quality of calcium carbonate and obtaining such high quality of calcium carbonate by washing out unreacted gypsum which is the sole impurity in calcium carbonate, and by taking high quality of gypsum for the Merseberg process and obtaining such quality of gypsum by filtering the schoenite end liquor prior to desulphatation and thereafter washing the gypsum with water.

Another inventive step is the use of surface modifying agent to improve the filterability of $Mg(OH)_2$ generated in the process and, at the same time, to yield surface-modified $Mg(OH)_2$ required in certain specific applications.

Another inventive step is the reasoning that, where MgO is the required product, such product would be obtained by calcination of $Mg(OH)_2$ and, in this process, the surface modifier would also get burnt off.

Another inventive step is the decomposition of kainite mixed salt with sea water to minimize use of fresh water.

Another inventive step is to neutralize residual ammonia in the filtrate of the Merseberg process with sulphuric acid to eliminate the need for ammonia recovery while simultaneously raising the concentration of ammonium sulphate in the liquor.

The following examples are given by way of illustration and should not be construed so as to limit the scope of present invention.

EXAMPLE-1

200 L of a solution (obtained upon decomposition of carnallite with water) containing 2.5 M concentration of $MgCl_2$ (total=500 mole) was treated under ambient condition with 200 L refined lime slurry having 91.3% available lime and 12.25% (w/v) CaO (total=438 mole). The contents were agitated for 30 min and then filtered on a filter press. The volume of filtrate was 290 L having 11.1% $CaCl_2$. The cake was washed with water and the total volume of washing was 130 L. The weight of the washed cake was 47 kg, which yielded 20.8 kg $Mg(OH)_2$ on drying at 110° C. The loss on drying was 55.7% (w/w). A part of the $Mg(OH)_2$ was calcined to yield MgO having 95.7% purity and 2.9% CaO content.

EXAMPLE-2

100 L of a solution [obtained after recovery of carnallite from evaporation of desulphated schoenite end liquor (see Scheme 1)] containing 4.4 M concentration of $MgCl_2$ (total=440 mole) was heated to 70° C. and treated with 240 L refined lime slurry having 90.6% available lime and 9.1% (w/v) CaO (total=353 mole). The contents were agitated at 70° C. for 30 min. 459 g of stearic acid was taken in 1 L of water, heated to melt, and then added into the reaction vessel under agitation. The temperature was lowered to 40° C. under stirring and the contents then filtered on a filter press. The volume of filtrate was 230 L having 14.8% $CaCl_2$. The cake was washed with water and the total volume of washing was 165 L. The weight of the washed cake was 38.3 kg, which yielded 18.5 kg $Mg(OH)_2$ on drying at 110° C. The loss on drying was 51.6% (w/w). A part of the $Mg(OH)_2$ was calcined to yield. MgO having 96.7% purity and 2.5% CaO content.

Besides the lower water content of wet cake obtained in Example 2 as compared to Example 1, it was observed that the filtration rate was nearly 2-fold higher in Example 2.

EXAMPLE-3

$Mg(OH)_2$ prepared as per the procedure of Examples 1 and 2 above were subjected to zeta potential measurement on a Zeta Potential Analyser equipped with PALS zeta potential analyzer version 3.41, Brookhaven Corporation and the values are given in the table below. It can be seen that the zeta potentials are markedly different indicating that stearic acid modifies the surface of the $Mg(OH)_2$ which process is expected to make the material hydrophobic.

| $Mg(OH)_2$ sample | Zeta potential of washed product, mV |
|---|---|
| A: with in situ stearic acid treatment at the time of washing | 10.55 |
| B: without stearic acid treatment | 33.39 |

Examples 1-3 teach us that the in situ incorporation of stearic acid at the time of filtration of $Mg(OH)_2$ leads to reduction in filtration time, lowers the moisture content in wet cake, and also marginally enhances the purity of the resultant MgO.

EXAMPLE-4

Schoenite end liquor (see Scheme 1) was obtained from the conversion of kainite mixed salt into schoenite as reported in the prior art of U.S. Pat. No. 7,041,268. It was filtered to remove all insoluble matter and thereafter treated with $CaCl_2$-containing solution obtained from the reaction of aqueous $MgCl_2$ with lime slurry (see also Scheme 1). The resultant gypsum was separated, washed with water and, dried at 45° C. to yield a product having 98% purity of gypsum ($CaSO_4.2H_2O$). 200 g (1.14 mole) of the gypsum was suspended in ammonia solution [400 mL; $NH_4OH$=2.53 moles] in 1 L high pressure reactor and the slurry was agitated at 500 rpm. $CO_2$ gas was introduced through gas inlet valve. Initially the $CO_2$ was consumed in the acid-base reaction with ammonia. As the reaction approached equilibrium, the pressure began to rise and the feed valve was closed when the pressure rose to 20 psi. The reaction was continued at 50° C for 2 h. The reaction was then quenched by releasing the pressurized gas. Solid from the reaction mass was separated by filtration, washed and dried at 110° C. to give 114 g of $CaCO_3$ of 94.2% purity ($CaCO_3$ 1.07 mole; 93.9% conversion with respect to gypsum taken). Ammonium sulphate was recovered separately from the filtrate following known procedures.

EXAMPLE-5

The experiment of Example 4 was repeated with 3.0 kg of gypsum in 10 L high pressure reactor. 1.68 kg of $CaCO_3$ having 92.7% purity was obtained along with 1.98 kg of ammonium sulfate. The $CaCO_3$ was further washed with water to preferentially dissolve unreacted gypsum and residual soluble impurities to give a product having 97.2% purity of $CaCO_3$ (w/w).

EXAMPLE-6

150 g (1.46 mole) of calcium carbonate prepared in Example 5 was calcined in a muffle furnace at 900° C. for 2 h. After calcination and cooling, 84.5 g quick lime having CaO purity of 96.6% (w/w) [(1.46 mole of CaO)] was obtained. 75 g (1.3 mole) of the lime was slaked with water to obtain 0.5 L of lime slurry which was then reacted with 0.340 L of a solution containing 1.50 mole of aqueous $MgCl_2$ [this solution, which additionally contained 2.0% (w/v) of $Ca^{2+}$, 0.23% (w/v) of KCl and 0.87% (w/v) of NaCl had a specific gravity of 1.3394 ($°Be'$=36.74)] obtained from evaporation of desulphated schoenite end liquor for recovery of carnallite for KCl (see Scheme 1). The reaction was carried out in a batch reactor at 75° C. for 30 min. Stearic acid [2% with respect to $Mg(OH)_2$ (w/w)] was added as surface modifying agent as described in Example 2. The resultant $Mg(OH)_2$ slurry was then processed as described in Example 2 to obtain 29.5 g of MgO having chemical composition MgO=96.8% (w/w), CaO=1.2% (w/w), $CaSO_4$=0.40% (w/w).

EXAMPLE-7

100 g of precipitated calcium carbonate of Example-5 was calcined as described in Example 6 above and slaked with water. The only difference from Example 6 was that the water used for slaking was first treated with hydrated lime and active carbon followed by filtration to remove insoluble material. It was then treated with aqueous aqueous. $MgCl_2$ solution as described in Example 6. The MgO obtained had chemical composition: MgO=97.9% (w/w), CaO=2.0% (w/w), $CaSO_4$=0.4% (w/w).

EXAMPLE-8

The experiment of example 7 was repeated and the MgO obtained had the chemical composition: MgO=98.2% (w/w), CaO=1.7% (w/w), $CaSO_4$=0.4% (w/w).

Examples 4-8 teaches us that high purity calcium carbonate can be produced from the gypsum obtained as by-product in SOP/MgO process and further that it can be used in place of conventional lime obtained from calcination of limestone to yield MgO of >98% purity (w/w). It would further be evident that the calcination process to obtain lime from calcium carbonate yields carbon dioxide as co-product which can be recycled in the Merseberg process of Examples 4-5.

Advantages Of The Invention

The main advantages of the present invention are:
 (i) Achieves value addition of the gypsum obtained from desulphatation of schoenite end liquor resulting in two dual-nutrient fertilizers, namely potassium sulphate and ammonium sulphate as part of the same process;
 (ii) Generates calcium carbonate of high purity in the process itself which is utilized completely in the preparation of ammonium sulphate and magnesium hydroxide/magnesium oxide of high purity;
 (iii) Dispenses with the need for outsourcing of high purity lime and carbon dioxide required for production of $Mg(OH)_2/CaCl_2$—$CaCl_2$ in turn being required for production of KCl from schoenite end liquor—and ammonium sulphate, respectively.

(iv) As a result, kainite mixed salt and ammonia are the only raw material inputs, besides small amounts of sulphuric acid and surface modifying agent that are used for operational simplicity;

(v) The process is in the realm of green technology as waste is converted into valuable product (ammonium sulphate) and raw material (calcium carbonate) used within the process;

(vi) Easy filtration of magnesium hydroxide through incorporation of surface modifying agent into the crude $Mg(OH)_2$ slurry, which simultaneously yields a wet cake having lower moisture content.

(vii) Demand for fresh water is reduced as a number of operations can be carried out with seawater or washings water generated in the process.

We claim:

1. A process for the simultaneous production of sulphate of potash (SOP), ammonium sulphate, surface modified magnesium hydroxide and/or magnesium oxide being characterized in the co-generation of the said products using kainite mixed salt and ammonia as the only consumable raw materials, the said process comprising the following steps:

a) converting in a first reaction zone, kainite mixed salt into schoenite by the process of aqueous leaching, wherein the aqueous leaching process comprises reacting kainite mixed salt with water and SOP end liquor of step (e) followed by separating the pure schoenite and schoenite end liquor (SEL);

b) treating the clear schoenite end liquor obtained in step (a) with aqueous $CaCl_2$ to separate out sulphate in the form of gypsum followed by filtering the mass to recover gypsum and desulphated schoenite end liquor;

c) subjecting the desulphated schoenite end liquor obtained in step (b) to evaporation to obtain solid carnallite and liquor rich in $MgCl_2$;

d) decomposing the carnallite obtained in step (c) with water to recover KCl and carnallite decomposed liquor (CDL) containing $MgCl_2$ and residual KCl;

e) treating the pure schoenite of step (a) with KCl obtained in step (d) to produce sulphate of potash (SOP) while recycling the SOP end liquor in the process of step (a);

f) washing the gypsum recovered in step (b) to minimize adhering impurities;

g) contacting in a second reaction zone gypsum obtained in step (f) with liquor ammonia or recycled ammonium sulphate mother liquor obtained in step (i) and carbon dioxide obtained in step (k) to produce ammonium sulphate solution and by-product $CaCO_3$ by the Merseberg reaction;

h) filtering out the $CaCO_3$, from the products of step (g) followed by neutralizing the filtrate with sulphuric acid to convert residual ammonia into ammonium sulphate;

i) evaporating the neutralized filtrate obtained in step (h) to recover ammonium sulphate while recycling the ammonium sulphate mother liquor in step (g);

j) washing the $CaCO_3$ obtained in step (h) with water to minimize unreacted gypsum and adhering soluble impurities followed by calcinations to obtain $CO_2$ and quicklime of high purity;

k) bottling the $CO_2$, and recycling in step (g);

l) slaking the lime generated in step (j) with decarbonated water and treating with CDL generated in step (d) and/or $MgCl_2$-rich liquor obtained in step (c) to produce dispersion of $Mg(OH)_2$ and aqueous $CaCl_2$;

m) adding a surface modifying agent to facilitate filtration of $Mg(OH)_2$, while simultaneously obtaining surface-modified $Mg(OH)_2$, required for special compounding applications;

n) separating the surface-modified $Mg(OH)_2$, from the slurry obtained in step (m) and recovering $CaCl_2$-containing filtrate followed by recycling it for the desulphatation process of step (b);

o) calcining the $Mg(OH)_2$, obtained in step (n) to recover MgO of high purity which simultaneously burns off the surface modifier.

2. The process as claimed in claim 1, wherein the kainite mixed salt is composed of 15-22% KCl; 15-22% NaCl; 28-40% $MgSO_4$ and 5-10% $MgCl_2$.

3. The process as claimed in claim 1, wherein the operation of aqueous leaching in step (a) of claim 1 is carried out utilizing fresh water or brackish ground water or even seawater along with the recycled SOP end liquor.

4. The process as claimed in claim 1, wherein the ratio of K+ in the form of pure schoenite and SEL of step (a) is 0.8-1.2 depending on amount of water added and the sulphate content of SEL was in the range of 5-12% (w/v).

5. The process as claimed in claim 1, wherein the gypsum obtained in step (b) above has a purity in the range of 96-99% (w/w).

6. The process as claimed in claim 1, wherein the residual ammonia in the filtrate obtained in step (h) is neutralized with sulphuric acid to convert it into ammonium sulphate.

7. The process as claimed in claim 1, wherein the $CaCO_3$ obtained in step (h) above is of a purity in the range of 95 to 97%.

8. The process as claimed in claim 1, wherein $CaCO_3$ obtained in step (h) is washed with water to minimized unreacted gypsum and adhering soluble impurities.

9. The process as claimed in claim 1, wherein the calcination of $CaCO_3$ in step (j) is carried out in the temperature range of 800-1000° C. for a period of 1 to 3 hrs.

10. The process as claimed in claim 1, wherein the decarbonated water used in the preparation of the lime slurry (slaked lime) of step (l) was obtained by treating the water with lime and removing suspended matter.

11. The process as claimed in claim 1, wherein the magnesium chloride in carnallite decomposed liquor is supplemented with $MgCl_2$-rich liquor of step (e), if required, for the preparation of $CaCl_2$ and $Mg(OH)$, as per the process of step (l).

12. The process as claimed in claim 1, wherein the molar ratio of lime to $MgCl_2$ is in the range of 0.8:1 to 0.95:1 in the reaction of step (l).

13. The process as claimed in claim 1, wherein the surface modifying agent is a free fatty acid, and the ratio of surface modifying agent to $Mg(OH)_2$ in step (m) was in the range of 0.01:1 to 0.05:1 (w/w).

14. The process as claimed in claim 1 wherein the rate of filtration of $Mg(OH)_2$ is 2-3 times faster in a filter press and the $Mg(OH)_2$ wet cake had 8-15% lower moisture content than without use of surface modifying agent.

15. The process as claimed in claim 1 wherein the purity of MgO obtained in step (o) is in the range of 95-99.5% (dry weight basis).

16. The process as claimed in claim 1 wherein the surface modifying agent is stearic acid.

* * * * *